2,891,089
Patented June 16, 1959

2,891,089
MIXED ESTERS OF POLYHYDRIC ALCOHOLS WITH NAPHTHENIC AND LOWER FATTY ACIDS

Samuel E. Jolly, Ridley Park, Pa., assignor to Sun Oil Company, Philadelphia, Pa., a corporation of New Jersey No Drawing. Application December 30, 1955
Serial No. 556,407

6 Claims. (Cl. 260—468)

This invention relates to mixed esters of polyhydric alcohols wherein at least one acid radical in the ester molecule is derived from petroleum naphthenic acids.

Petroleum naphthenic acids are mixtures of cyclic monocarboxylic acids which can be obtained from crude petroleum by conventional separation processes as well known in the prior art. Naphthenic acids are generally recovered as a mixture of acids of varying composition and molecular weight, and the mixtures generally boil through a rather wide range of boiling points, for example a 75° F. boiling range, or more commonly a 150° F. or greater boiling range.

The saponification number, expressed in mg. of KOH per gram, is a convenient method of characterizing naphthenic acids according to their average molecular weight. The relatively low molecular weight naphthenic acid fractions recovered from petroleum may have saponification numbers for example within the approximate range from 200 to 320 mg. of KOH per gram, whereas the relatively high molecular weight naphthenic acid fractions may have saponification numbers within the approximate range from 120 to 200 mg. of KOH per gram.

According to the present invention, ester compositions are provided which are derived from alcohols containing a plurality of hydroxyl groups, at least one of which is esterified with petroleum naphthenic acids to form the composition according to the invention. Since the naphthenic acids employed are generally mixtures of a very large number of different carboxylic acids, the esters produced are also a mixture of compounds differing in the acid part of the ester molecule.

The esters according to the invention are preferably esters of relatively high molecular weight naphthenic acids, having saponification number within the approximate range from 120 to 200 mg. of KOH per gram. Such acids generally have 50% point, in distillation at 10 mm. of Hg absolute pressure, above 200° C., and more preferably the 50% point, in distillation at 2 mm. of Hg absolute pressure, is above 175° C.

The ester compositions according to the invention are characterized by the fact that they contain, in addition to the naphthenic acid radical, another acid radical in the molecule, which radical is derived from a monocarboxylic acid having the formula RCOOH where R is a hydrocarbon radical having less than 4 carbon atoms. The ester compositions according to the invention thus are mixed esters containing at least two different acid radicals in the molecule. The presence of the naphthenic acid radical, in addition to the radical of the other acid employed, provides advantageous properties in the ester compositions.

Examples of suitable acids, other than naphthenic acids, for use according to the invention are formic acid, acetic acid, propionic acid, and butyric acid. The esters according to the invention contain at least one naphthenic acid radical per molecule and at least one radical of another carboxylic acid per molecule. More radicals of either type can also be incorporated in the molecule if desired.

In one embodiment of the invention, the esters are substantially free of unesterified hydroxyl groups. However, partial esters, having generally 1 to 4 free hydroxyl groups, are contemplated in other embodiments of the invention.

The polyhydric alcohol which is employed to prepare the ester compositions according to the invention is a saturated acyclic polyhydric alcohol. Examples of suitable such alcohols are the various glycols such as ethylene glycol, the propanediols, the butanediols, the pentanediols, the hexanediols, the octanediols, the polyethylene glycols such as diethylene glycol, triethylene glycol, etc.; glycerol; pentaerythritol; the various hexitols, etc.

The ester compositions according to the invention can be prepared by any of various methods for the preparation of mixed esters of polyhydric alcohols. Thus for example a polyhydric alcohol can be esterified successively with the two or more different acids employed; or the polyhydric alcohol may be esterified simultaneously with a mixture of the two or more different acids employed. The esters can also be prepared by ester interchange reactions, such as those involving the reaction of naphthenic acids with alcoholysis products of a natural triglyceride to replace an acid radical or radicals of the original triglyceride with naphthenic acid radicals.

An esterification catalyst can be used if desired; various esterification catalysts, such as toluene sulfonic acid, sulfuric acid, etc. are well known in the art. Alternatively, the use of esterification catalyst can be omitted, and an acid anhydride or acid chloride employed in the esterification reaction, such derivatives of carboxylic acids being generally more reactive in esterification than the acids themselves.

The novel ester compositions according to the invention are useful in various applications. For example, they may be incorporated in various petroleum compositions to provide improvement in the properties of the petroleum fractions for various uses. Thus for example, the compositions can be added in minor amounts to petroleum lubricating oils to improve the extreme pressure properties of the oil, the viscosity index of the oil, the oxidation stability, the corrosion resistant properties of the oil, etc. The ester compositions can also be incorporated in minor amount in gasoline compositions to inhibit such compositions against the formation of ice crystals in the gasoline under low temperature conditions of use.

In addition to being valuable additives for petroleum lubricants, the ester compositions according to the invention have highly satisfactory properties for use as lubricants per se. They may also be used for additives for known petroleum lubricating oils, to improve various properties of such oils.

The ester compositions according to the invention are also useful as plasticizers for various synthetic resins and plastics. Thus for example they may be employed as plasticizers for the various vinyl polymers, such as polyvinyl chloride, polyvinyl formal, polyvinyl acetal, polyvinyl butyral, polystyrene, etc. In polyvinyl chloride compositions, the esters according to the invention are most suitable for use as a secondary plasticizer, together with a primary plasticizer of the prior art. The various materials suitable for use as primary plasticizers are well known in the art as a class, and the esters according to the invention are generally suitable for use as a secondary plasticizer with any of these known primary plasticizers.

The following illustrates the invention:

A monoester of glycerol and naphthenic acids was prepared according to previously known procedures. The naphthenic acids employed conformed in preparation and properties to those sold commercially under the trademark "Sunaptic Acids A." Typical properties for such acids are the following: acid number 178 mg. of KOH per gram, average molecular weight 297, average molecular formula $C_{19}H_{34}O_2$, average type formula $C_nH_{2n-4}O_2$, distillation range 315–485° F./2 mm. Hg (0–95%), and 50% point of 365° F./2 mm. Hg.

The monoester had a saponification number of 145 mg. of KOH per gram, as compared with a theoretical saponification number of 148. The acid number of the monoester was about 2 mg. of KOH per gram, as compared with a theoretical acid number of zero. The hydroxyl number of the monoester was 105, as compared with a theoretical hydroxyl number of 146.

A solution of this product in toluene was reacted with acetic anhydride by refluxing for 4 hours. The mole ratio of acetic anhydride to the monoester, based on the theoretical molecular weight of the latter, was about 2. After refluxing for 4 hours, the mixture was cooled, washed with water, and distilled to remove toluene, thereby obtaining as residue a product having N.P.A. color of 8+. This color was reduced to 3½ N.P.A. by percolating a pentane solution through Attapulgus clay. After distillation of pentane from the resulting solution, the product obtained as residue had the following properties: saponification number 270, acid number 2, and hydroxyl number zero.

The theoretical saponification number for an ester containing two acetic acid radicals per molecule and one naphthenic acid radical (having molecular weight of 297) per molecule is about 360, whereas the theoretical saponification number for esters containing two such naphthenic acid radicals and one acetic acid radical is about 230. Accordingly, it appears that the product obtained in the present instance was probably a mixture of these two possible ester compositions. The incorporation of two naphthenic acid radicals in some of the molecules probably occurred during the original esterification of glycerol with naphthenic acids, and the diglycerides thus formed were not separated from the monoglycerides prior to the further reaction with acetic anhydride.

The product obtained as described above had Saybolt Universal viscosity at 100° F. of 172.3, and Saybolt Universal viscosity at 210° F. of 84.2. The viscosity index was 173, the specific gravity 1.004 and the refractive index 1.4900. The high viscosity index of the product indicates that it has exceptionally good properties for those uses of lubricating oils wherein a high viscosity index is required.

The product can be employed as a lubricant itself, or as an additive to be used in minor amount in mineral lubricating oil. The incorporation of the product in mineral lubricating oil generally results in an oil having increased viscosity index, as well as other beneficial properties. Mineral lubricating oil having Saybolt Universal viscosity at 100° F. of about 110, containing 5 percent of the ester product described above, was found to have an interfacial tension (as determined by A.S.T.M. D971–48T) of 21.4 dynes per centimeter, as compared with 27.3 dynes per centimeter for the same oil not containing the ester product.

The product can also be employed in plasticized polyvinyl chloride compositions having for example the following approximate composition: polyvinyl chloride, 60 percent; di(2-ethylhexyl) phthalate, 20 percent; and esters according to the invention, 20 percent. The various constituents as indicated can be milled together on a rubber mill at 300° C. for example to produce a homogeneous composition which can be removed as a plastic sheet from the rubber mill. The plasticized composition thus obtained has highly satisfactory properties from the standpoint of flexibility, heat stability, resistance to extraction by water, hardness, low temperature properties as indicated by brittle point, etc.

The invention claimed is:

1. As new compositions of matter, esters of saturated acyclic polyhydric alcohols, which alcohols contain not more than 6 hydroxyl groups per molecule, said esters containing at least one radical of petroleum naphthenic acids having 50% point at 10 mm. Hg of at least 200° C. and at least one radical of a monocarboxylic acid other than naphthenic acids, said monocarboxylic acid having the formula RCOOH where R is a hydrocarbon radical containing less than 4 carbon atoms.

2. Composition according to claim 1 wherein said monocarboxylic acid is acetic acid.

3. Composition according to claim 1 wherein said polyhydric alcohol is glycerol, and the esters are substantially free of hydroxyl groups.

4. As new compositions of matter, esters of saturated acyclic polyhydric alcohols, which alcohols contain not more than 6 hydroxyl groups per molecule, said esters containing at least one radical of petroleum naphthenic acids and at least one radical of a monocarboxylic acid other than naphthenic acids, said monocarboxylic acid having the formula RCOOH where R is a hydrocarbon radical containing less than 4 carbon atoms, said esters being substantially free of hydroxyl groups.

5. As a new composition of matter, glycerol acetate-naphthenate substantially free of unesterified hydroxyl groups and having Saybolt Universal viscosity at 210° F. of about 84 seconds and containing at least one radical of petroleum naphthenic acids having 50% point at 10 mm. of Hg of at least 200° C.

6. Method for preparing mixed esters of glycerol which comprises partially esterifying glycerol with petroleum naphthenic acids, and reacting the resulting ester with acetic anhydride at esterification temperature.

References Cited in the file of this patent

UNITED STATES PATENTS

| | | |
|---|---|---|
| 2,016,392 | Schneider | Oct. 8, 1935 |
| 2,023,388 | Harris | Dec. 3, 1935 |
| 2,029,925 | Hull | Feb. 4, 1936 |
| 2,085,014 | Dreyfus et al. | June 29, 1937 |
| 2,087,603 | Mikeska et al. | July 20, 1937 |
| 2,119,718 | Pevere | June 7, 1938 |
| 2,298,670 | Alleman et al. | Oct. 13, 1942 |
| 2,438,753 | Kellog | Mar. 30, 1948 |
| 2,599,803 | Ballard et al. | June 10, 1952 |
| 2,697,087 | Hertzel | Dec. 14, 1954 |
| 2,700,656 | Emerson et al. | Jan. 25, 1955 |